United States Patent
Reinhardt (10) Patent No.: US 10,569,601 B2
(45) Date of Patent: Feb. 25, 2020

(54) TIRE WITH ARCHED SPOKES

(71) Applicant: Bridgestone Americas Tire Operations, LLC, Nashville, TN (US)

(72) Inventor: Sharon E. Reinhardt, Fairlawn, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 319 days.

(21) Appl. No.: 15/536,889

(22) PCT Filed: Dec. 8, 2015

(86) PCT No.: PCT/US2015/064510
§ 371 (c)(1),
(2) Date: Jun. 16, 2017

(87) PCT Pub. No.: WO2016/100017
PCT Pub. Date: Jun. 23, 2016

(65) Prior Publication Data
US 2018/0001704 A1     Jan. 4, 2018

Related U.S. Application Data (60) Provisional application No. 62/093,646, filed on Dec. 18, 2014.

(51) Int. Cl.
*B60C 7/14* (2006.01)
*B60C 7/10* (2006.01)

(52) U.S. Cl.
CPC ............... *B60C 7/14* (2013.01); *B60C 7/102* (2013.01); *B60C 2007/146* (2013.01)

(58) Field of Classification Search
CPC ..... B60C 2007/147; B60C 7/14; B60C 7/102; B60C 7/18; B60C 7/22
See application file for complete search history.

(56) References Cited

U.S. PATENT DOCUMENTS

| | | | | |
|---|---|---|---|---|
| 2,620,844 | A | * 12/1952 | Lord | B60C 7/12 152/326 |
| 5,042,544 | A | * 8/1991 | Dehasse | B60C 7/12 152/302 |
| 5,343,916 | A | 9/1994 | Duddey et al. | |
| D364,841 | S | 12/1995 | Brannan et al. | |

(Continued)

FOREIGN PATENT DOCUMENTS

| | | |
|---|---|---|
| JP | 2013079037 | 5/2013 |
| KR | 10-2012-0063616 | 6/2012 |

OTHER PUBLICATIONS

International Search Report and Written Opinion of the International Searching Authority; corresponding PCT Application No. PCT/US2015/064510; Authorized Officer Bae, Geun Tae; dated Mar. 28, 2016.

*Primary Examiner* — Kip T Kotter
(74) *Attorney, Agent, or Firm* — Shaun J. Fox; Bryan Jaketic (57) ABSTRACT

A tire includes an inner hoop, an outer hoop, and a plurality of spokes extending from the inner hoop to the outer hoop. Each of the spokes includes a y-shaped base, including a radially extending stem, a first concave branch, and a second concave branch. The spokes further include a convex member extending from the first concave branch to the second concave branch.

20 Claims, 6 Drawing Sheets

(56) References Cited

U.S. PATENT DOCUMENTS

| | | |
|---|---|---|
| D401,896 S | 12/1998 | Chandler et al. |
| 6,068,353 A | 5/2000 | Juncker et al. |
| 6,681,822 B2 | 1/2004 | Adams et al. |
| D507,522 S | 7/2005 | Becker et al. |
| 7,143,797 B2 | 12/2006 | Vannan |
| D536,298 S | 2/2007 | Becker et al. |
| 7,174,936 B2 | 2/2007 | Becker et al. |
| D548,681 S | 8/2007 | Becker et al. |
| D630,566 S | 1/2011 | Ebel et al. |
| D634,700 S | 3/2011 | Ebel et al. |
| 7,950,428 B2 | 5/2011 | Hanada et al. |
| 8,056,593 B2 | 11/2011 | Palinkas et al. |
| 8,061,398 B2 | 11/2011 | Palinkas et al. |
| 8,104,524 B2 | 1/2012 | Manesh et al. |
| 8,109,308 B2 | 2/2012 | Manesh et al. |
| 8,113,253 B2 | 2/2012 | Arakawa et al. |
| 8,176,957 B2 | 5/2012 | Manesh et al. |
| D668,205 S | 10/2012 | Ebel et al. |
| 8,276,628 B2 | 10/2012 | Hanada et al. |
| 8,544,515 B2* | 10/2013 | Ma .................. B60C 7/14 152/151 |
| 8,567,461 B2 | 10/2013 | Williams et al. |
| 9,120,351 B2* | 9/2015 | Mun .................. B60C 7/18 |
| 9,290,053 B2* | 3/2016 | Choi .................. B60C 7/18 |
| 9,333,799 B2* | 5/2016 | Choi .................. B60C 7/18 |
| 9,387,726 B2* | 7/2016 | Choi .................. B60C 7/18 |
| 2004/0012246 A1* | 1/2004 | Rhyne .................. B60B 1/0223 301/55 |
| 2005/0133133 A1 | 6/2005 | Becker et al. |
| 2006/0144488 A1 | 7/2006 | Vannan |
| 2008/0314486 A1* | 12/2008 | Manesh .................. B60C 7/14 152/328 |
| 2010/0132858 A1 | 6/2010 | Arakawa et al. |
| 2010/0200131 A1 | 8/2010 | Iwase et al. |
| 2011/0030866 A1* | 2/2011 | Fadel .................. B60C 7/18 152/311 |
| 2011/0180194 A1* | 7/2011 | Anderson .................. B60C 17/04 152/520 |
| 2012/0060991 A1* | 3/2012 | Mun .................. B60C 7/18 152/323 |
| 2012/0067481 A1 | 3/2012 | Cron |
| 2013/0240272 A1* | 9/2013 | Gass .................. B60B 9/00 180/54.1 |
| 2014/0000777 A1 | 1/2014 | Choi et al. |
| 2014/0020817 A1 | 1/2014 | Williams et al. |
| 2014/0034219 A1 | 2/2014 | Chadwick et al. |
| 2014/0062168 A1 | 3/2014 | Martin et al. |
| 2014/0062169 A1 | 3/2014 | Martin et al. |
| 2014/0062170 A1 | 3/2014 | Martin et al. |
| 2014/0062171 A1 | 3/2014 | Martin et al. |
| 2014/0062172 A1 | 3/2014 | Martin et al. |

\* cited by examiner

TIRE WITH ARCHED SPOKES

FIELD OF INVENTION

The present disclosure relates to a tire having spokes. More particularly, the present disclosure relates to a non-pneumatic tire having a plurality of spokes with concave and convex elements.

BACKGROUND

Various tire constructions have been developed which enable a tire to run in an uninflated or underinflated condition. "Run flat tires" may continue to operate after being punctured and experiencing a complete or partial loss of pressurized air for extended periods of time and at relatively high speeds. Non-pneumatic tires do not require inflation and may be particularly useful in off-road applications and in locations where it would be difficult to repair or replace a tire. Some known non-pneumatic tires include a plurality of spokes extending between an inner hoop and an outer hoop.

SUMMARY

In one embodiment a non-pneumatic tire includes an inner annular band and an outer annular band constructed of a polymeric material and having a reinforcement structure embedded therein. A plurality of spokes extends from the inner annular band to the outer annular band. The spokes are configured to carry a load in compression and in tension. Each spoke includes a first concave sidewall and a second concave sidewall opposite the first concave sidewall. Each spoke also includes an upper convex arch having a first end connected to the first concave sidewall and a second end connected to the second concave sidewall. A bottom portion of the first concave sidewall is connected to a bottom portion of the second concave sidewall. Additionally, the first concave sidewall, the second concave sidewall, and the upper convex arch form a closed geometric shape.

In an alternative embodiment a tire includes a first hoop, a second hoop, and a plurality of spokes extending from the first hoop to the second hoop. Each spoke includes a first sidewall having a concave shape when the tire is in an unloaded condition and a second sidewall opposite the first sidewall. The second sidewall also has a concave shape when the tire is in an unloaded condition. A bottom portion of the first sidewall is connected to a bottom portion of the second sidewall. Each spoke also includes an upper member having a first end connected to the first sidewall and a second end connected to the second sidewall. The first sidewall, the second sidewall, and the upper member form a closed geometric shape. The upper member has a convex shape when the tire is in an unloaded condition.

In another alternative embodiment a tire includes an inner hoop, an outer hoop, and a plurality of spokes extending from the inner hoop to the outer hoop. Each of the spokes includes a y-shaped base, including a radially extending stem, a first concave branch, and a second concave branch. The spokes further include a convex member extending from the first concave branch to the second concave branch.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Likewise, the terms "inward" and "inwardly" refer to a general direction towards the axis of rotation, whereas "outward" and "outwardly" refer to a general direction away from the axis of rotation and towards the tread of the tire. Thus, when relative directional terms such as "inner" and "outer" are used in connection with an element, the "inner" element is spaced closer to the axis of rotation of the tire than the "outer" element.

Figure 1:
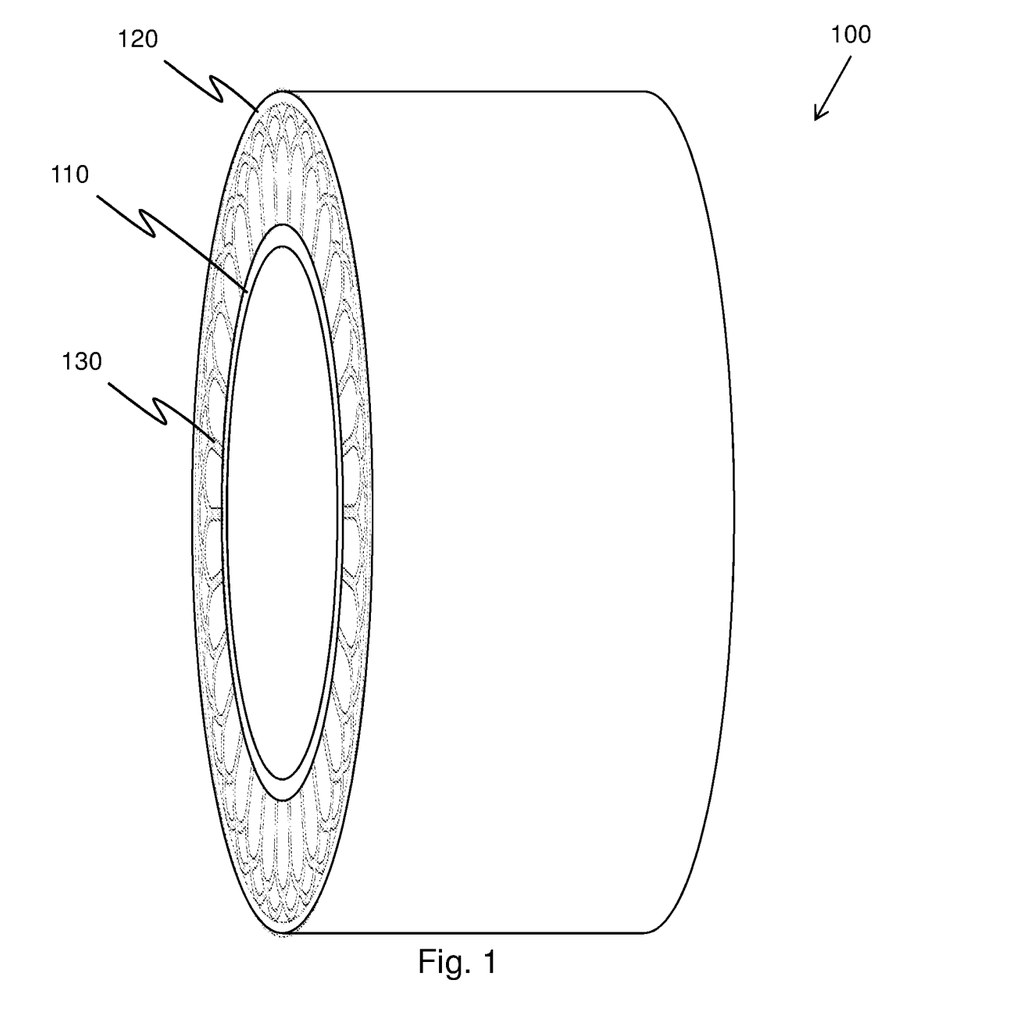
FIG. 1 illustrates a perspective view of one embodiment of a non-pneumatic tire 100.

FIG. 1 is a perspective view of one embodiment of a non-pneumatic tire 100. The non-pneumatic tire 100 includes an inner annular band 110 and an outer annular band 120. The inner and outer annular bands 110, 120 may also be referred to as hoops. A plurality of spokes 130 extend from the inner annular band 110 to the outer annular band 120. In one embodiment, each spoke 130 extends axially across the inner and outer annular bands 110, 120. In an alternative embodiment, each spoke extends only partially across the inner and outer annular bands. In one such embodiment, two or more rows of spokes may be employed. The rows may be aligned with each other or offset from each other.

The inner annular band 110 is configured to be received by a wheel of a vehicle. In an alternative embodiment (not shown), the tire is integrated with a wheel.

In one known embodiment, the inner annular band 110, outer annular band 120, and spokes 130 are separate components constructed of different materials. In one known embodiment, the inner annular band is constructed of a polymeric material, such as polyurethane, polyester, or thermoplastic. The inner annular band may also be constructed of resin or a metal, such as steel. The inner annular band is configured to be mounted to a wheel that may be constructed of metal.

In one embodiment, the spokes are constructed of a polymeric material, such as polyurethane, and the outer annular band is constructed of a resilient material, such as rubber and may include embedded reinforcements. In an alternative embodiment, each of the inner and outer bands and the spokes are constructed of substantially the same material. For example, each of the inner and outer bands and the spokes may be constructed of a polymeric material, such as polyurethane, polyester, or thermoplastic. The inner and outer bands and the spokes may also be constructed of one or more resins. In such embodiments, the tire may be constructed as a single, unitary component through a casting, molding, or additive manufacturing process.

Figure 2:
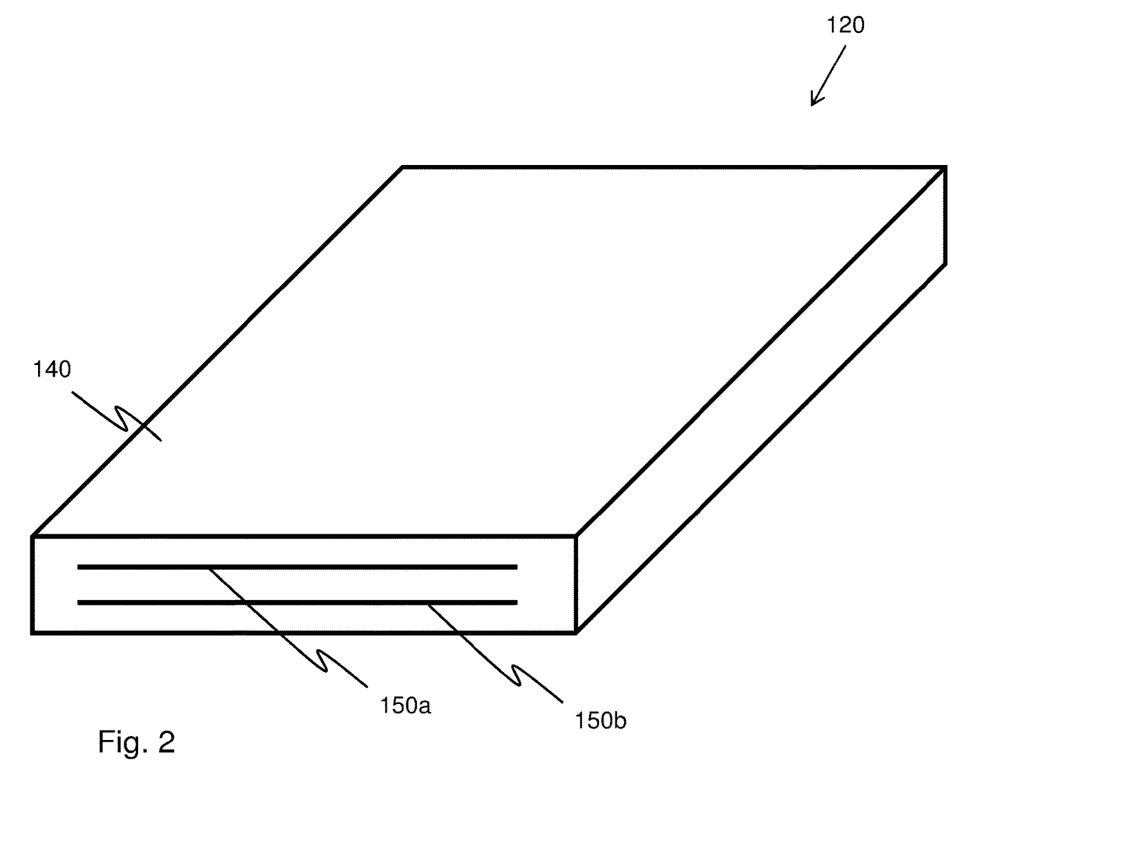
FIG. 2 illustrates a cutaway of an outer annular band of the non-pneumatic tire.

In one embodiment, the outer annular band 120 is the tread of tire 100. As such, it may include ribs, blocks, grooves, sipes, or other tread elements (not shown). FIG. 2 illustrates a cutaway of the outer annular band 120, where the outer annular band functions as a tire tread. The outer annular band 120 is constructed of a resilient material 140, such as rubber, and includes a first reinforcement structure 150a and a second reinforcement structure 150b. The reinforcement structures 150a,b allow the outer annular band 120 to carry some or all of the load that is transferred by the spokes 130. While two reinforcement structures are illustrated, it should be understood that a single reinforcement structure may be employed. Alternatively, three or more reinforcement structures may be employed.

The reinforcement structures 150a,b are stiffer than the material of the spokes 130. Exemplary reinforcement structures include, without limitation, a single angled steel belt, a pair of angled steel belts, and a thin steel band. In one embodiment, the reinforcement structures 150a,b are the same (e.g., a first reinforcement structure 150a is a pair of angled steel belts, and a second reinforcement structure 150b is a pair of angled steel belts). In an alternative embodiment, the reinforcement structures 150a,b are different (e.g., a first reinforcement structure 150a is a pair of angled steel belts, and a second reinforcement structure 150b is a thin steel band).

The resilient material 140 between the first reinforcement structure 150a and the second reinforcement structure 150b is the same as the material above and below the reinforcement structures 150a,b. In an alternative embodiment, the material between the first reinforcement structure and the second reinforcement structure is different from the material above and below the reinforcement structures 150a,b.

In one embodiment, the reinforcement structures form a high annular strength band that acts as a structural compression member on the tire, and increases interlaminar shear strength across the axial length of the tire. The reinforcement structures are inelastic outer portions that sandwich an elastic center portion. Other examples of high annular strength bands are discussed in U.S. Pat. No. 5,879,484, which is incorporated by reference herein in its entirety. The high annular strength band may also be referred to as a "shear band" or "band."

While FIG. 1 depicts an embodiment in which the outer annular band is a tread, in an alternative embodiment (not shown), a separate tread layer is circumferentially disposed about the outer annular band. The tread layer may be attached to the outer annular band by an adhesive, or it may bond to the outer annular band through a curing process. The separate tread layer may include the reinforcement structures described above. Alternatively, a separate high annular strength band, or shear band, may be circumferentially disposed between the outer annular band and the tread layer.

Figure 3:
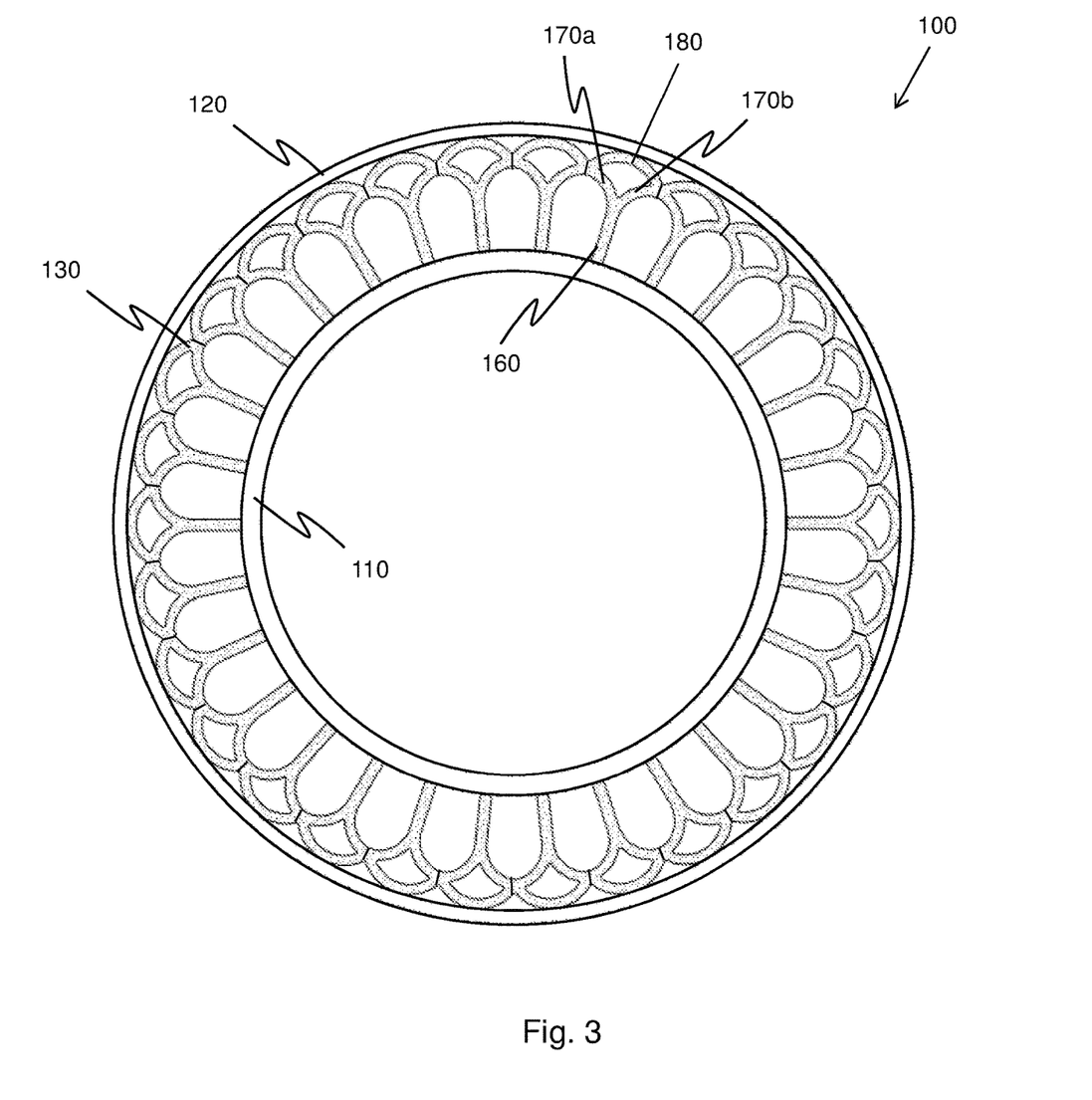
FIG. 3 illustrates a side view of the non-pneumatic tire 100.

FIG. 3 illustrates a side view of the tire 100. As can be seen from this view, each of the spokes 130 includes a "y-shaped" base that has a radially extending stem 160, a first concave branch 170a, and a second concave branch 170b. In an alternative embodiment (not shown), the stem may be omitted.

Each spoke 130 further includes a convex member 180 that extends from the first concave branch 170a to the second concave branch 170b. In the illustrated, each spoke 130 is a discrete spoke, with the stem 160 contacting the inner annular band 110 and the convex member 180 contacting the outer annular band. The branches 170a,b and convex member 180 of each spoke contact the branches and convex member of each adjacent spoke. In an alternative embodiment, the spokes may be spaced from each other.

The branches 170a,b of the spokes 130 may also be referred to as the sidewalls of the spokes and the convex member 180 may also be referred to as an arch. In one embodiment, the branches 170a,b are circular arcs that are defined by a single radius. Similarly, the convex member 180 is a circular arc that is defined by a single radius. In an alternative embodiment, one or more of the branches is defined by multiple radii. In another alternative embodiment, the convex member is defined by multiple radii. In another alternative embodiment, one or more of the branches and the convex member may be defined by a geometric curve, such as a parabola, an ellipse, a cardioid, a hyperbola, a catenary, a cycloid, a trochoid, or other known curve.

In the illustrated embodiment, a first end of the convex member 180 is connected to an end of the first branch 170a, and a second end of the convex member 180 is connected to an end of the second branch 170b, such that the convex member 180 and the branches 170a,b form a closed geometric shape.

FIG. 3 shows the tire 100 in an unloaded condition. When the tire is in a loaded condition, at least some of the spokes below an axis of the tire are in compression and at least some of the spokes above the axis are in tension. Each spoke carries a load while in compression and also while in tension. In one embodiment, each spoke is stiffer in tension than in compression.

The spokes may buckle under compression or tension, depending on the size of the load, the material and geometry of the spokes, and other factors. Even if buckling occurs, however, the branches 170 retain their concave shapes and the convex member 180 retains its convex shape when the spoke 130 is placed in compression. Likewise, the branches 170 retain their concave shapes and the convex member 180 retains its convex shape when the spoke 130 is placed in tension. In an alternative embodiment, the convex member flattens when the spoke is placed in compression.

Figure 4:
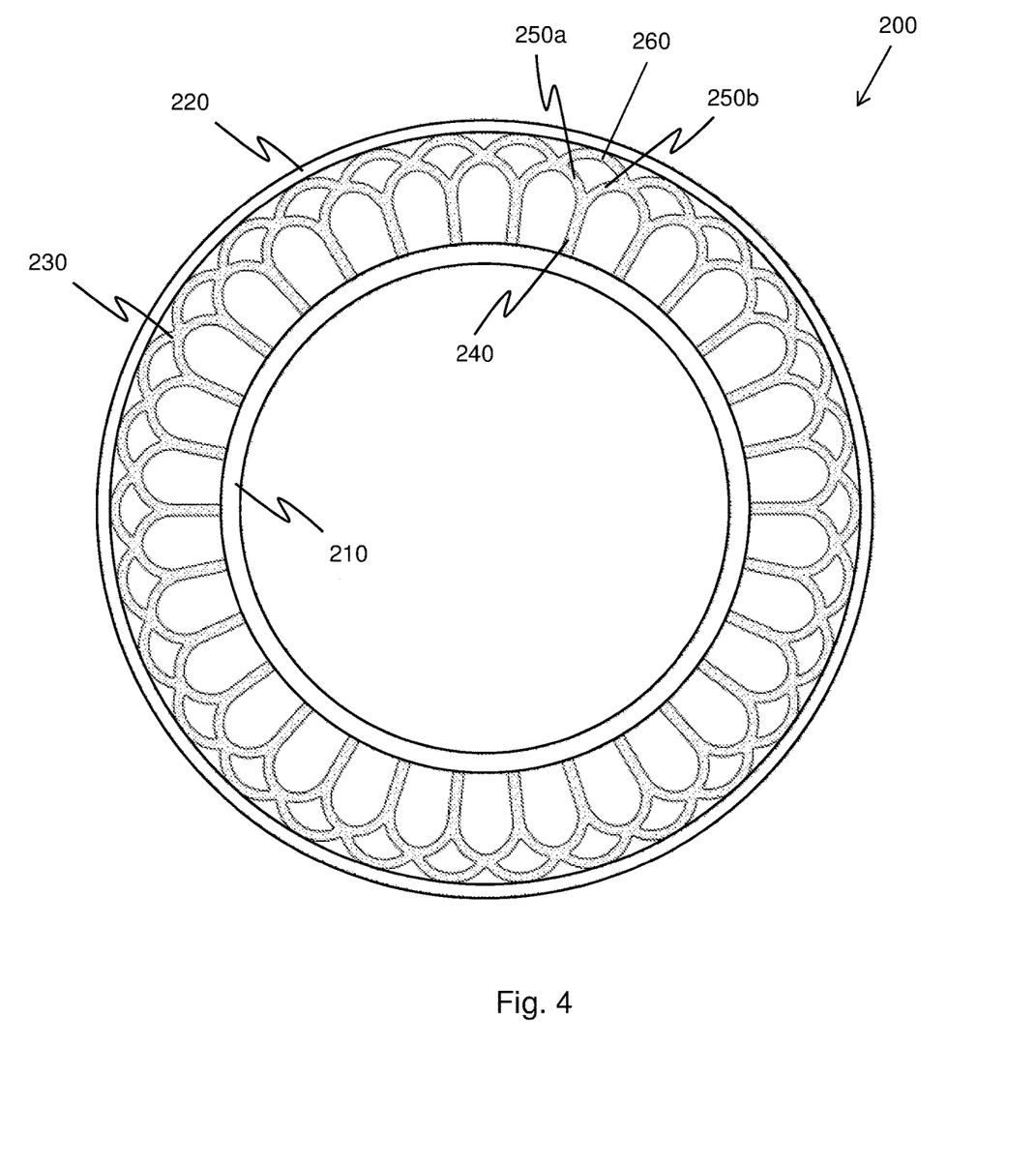
FIG. 4 illustrates a side view of an alternative embodiment of a non-pneumatic tire.

FIG. 4 illustrates a side view of an alternative embodiment of a non-pneumatic tire 200. The non-pneumatic tire 200 includes an inner annular band 210 and an outer annular band 220 connected by a plurality of spokes 230. The tire 200 is substantially the same as the tire 100 shown in FIGS. 1-3 and discussed above, except for the differences described herein. The alternative embodiments discussed in reference to tire 100 may also be employed with the tire 200.

The spokes 230 of the tire 200 are not discrete. Instead, the spokes 230 form a web. Each spoke includes a y-shaped base that has a radially extending stem 240, a first concave branch 250a, a second concave branch 250b, and a convex member 260 that extends from the first concave branch 250a to the second concave branch 250b. The stem 240 extends from the inner annular band 210 and the convex member 260 contacts the outer annular band 220. The branches 250a,b and convex member 260 are seamlessly joined with the branches and convex members of the adjacent spokes. The web may be formed as a unitary member through a casting, molding, or additive manufacturing process. Alternatively, the individual spokes may be made by a casting, molding, or additive manufacturing process, and later joined to each other. For example, the spokes may be joined by adhesive, welding, brazing, or a curing process.

Figure 5:
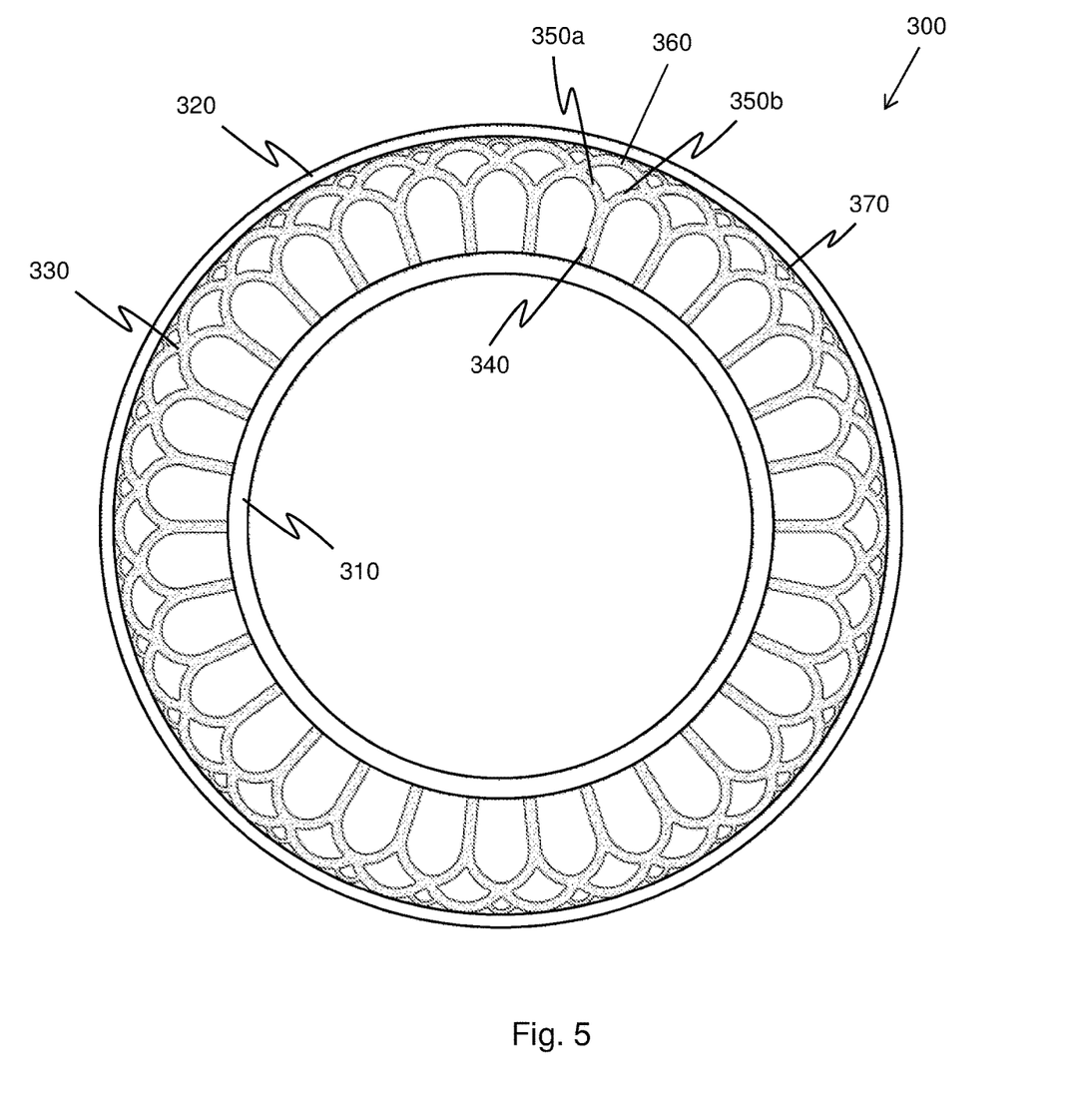
FIG. 5 illustrates a side view of another alternative embodiment of a non-pneumatic tire.

FIG. 5 illustrates a side view of another alternative embodiment of a non-pneumatic tire 300. The non-pneumatic tire 300 includes an inner annular band 310 and an outer annular band 320 connected by a plurality of spokes 330. The tire 300 is substantially similar to the tires 100 and 200 shown in FIGS. 1-4 and discussed above, except for the differences described herein. The alternative embodiments discussed in reference to tires 100 and 200 may also be employed with the tire 300.

Each spoke of the tire 300 includes a y-shaped base that has a radially extending stem 340, a first concave branch 350a and a second concave branch 350b. Each spoke also includes a convex member 360 that extends from the first concave branch 350a to the second concave branch 350b. Additionally, the spokes include a plurality of connecting members 370. Each connecting member 370 has a first end connected to a convex member of a first spoke and a second end connected to a convex member of a second spoke adjacent to the first spoke. In the illustrated embodiment, the connecting member 370 is a convex arc defined by a single radius. In an alternative embodiment (not shown), the connecting member is defined by multiple radii. In one specific embodiment, the connecting member is a geometric curve. In another alternative embodiment, the connecting member includes at least one linear component.

The stem 340 extends from the inner annular band 310, and both the convex member 360 and the connecting member 370 contact the outer annular band 320. In an alternative embodiment (not shown), only the convex member contacts the outer annular band. In another alternative embodiment (not shown), only the connecting member contacts the outer annular band.

The branches 350a,b and convex member 360 of each spoke are connected to the branches and convex members of the adjacent spokes. In the illustrated embodiment, the spokes 330 are not discrete, but instead form a web. In an alternative embodiment, each spoke is discrete.

Figure 6:
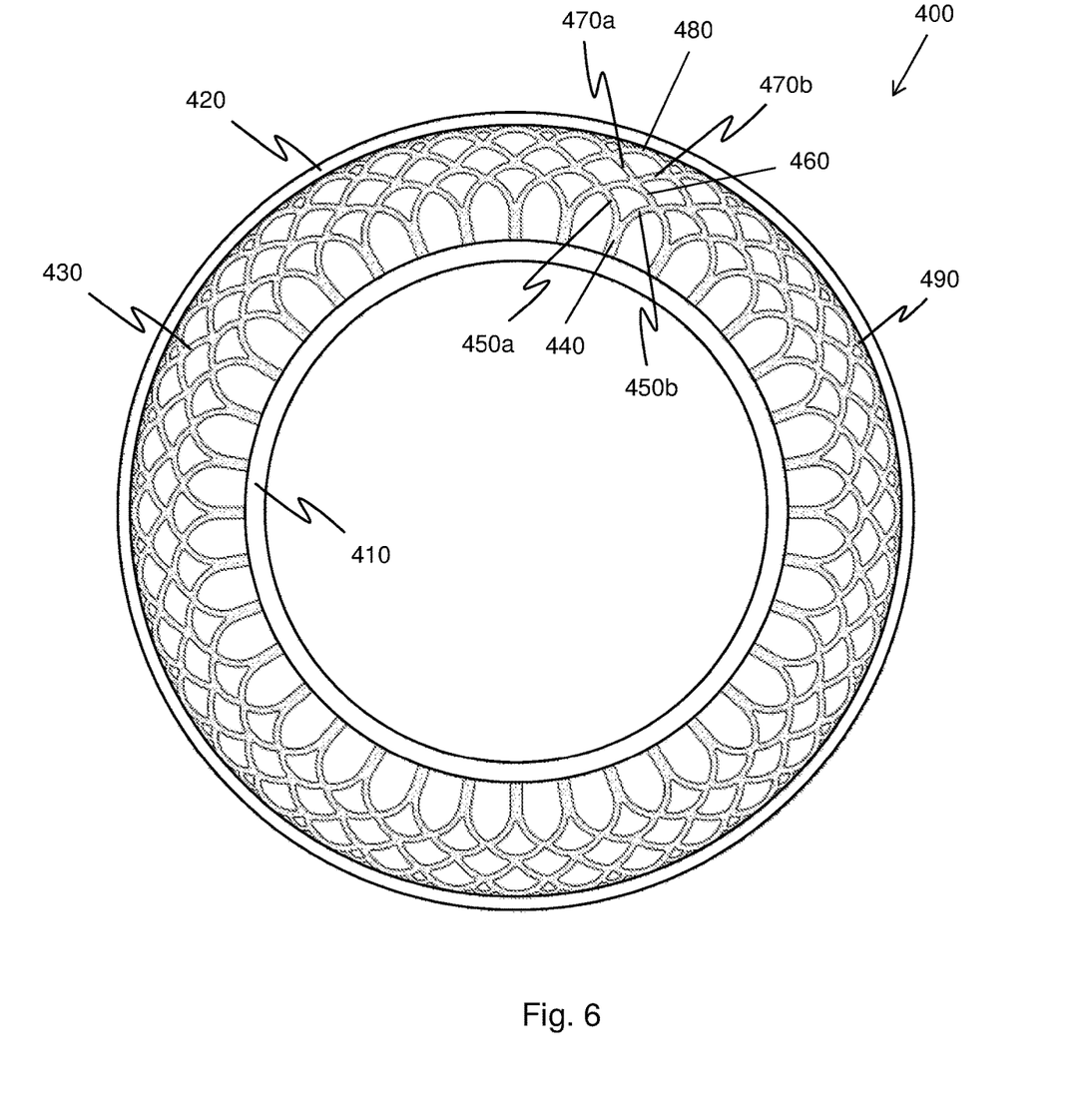
FIG. 6 illustrates a side view of yet another alternative embodiment of a non-pneumatic tire.

FIG. 6 illustrates a side view of another alternative embodiment of a non-pneumatic tire 400. The non-pneumatic tire 400 includes an inner annular band 410 and an outer annular band 420 connected by a plurality of spokes 430. The tire 400 is substantially similar to the tires 100, 200, and 300 shown in FIGS. 1-5 and discussed above, except for the differences described herein. The alternative embodiments discussed in reference to tires 100, 200, and 300 may also be employed with the tire 400.

Each spoke includes a y-shaped base that has a radially extending stem 440, a first concave branch 450a, a second concave branch 450b, and a first convex member 460 that extends from the first concave branch 450a to the second concave branch 450b. Additionally, each spoke includes a third concave branch 470a having a bottom portion connected to a top portion of the first convex member 460. Each spoke also has a fourth concave branch 470b having a bottom portion connected to the top portion of the first convex member 460 and to the bottom portion of the third concave branch 470a. A second convex member 480 has a first end connected to a top portion of the third concave branch 470a and a second end connected to a top portion of the fourth concave branch 470b. In this embodiment, the first concave branch 450a, second concave branch 450b, and first convex member 460 form a closed geometric shape. Likewise, the third concave branch 470a, the fourth concave branch 470b, and the second upper convex member 480 form a second closed geometric shape.

The spokes 430 further include a plurality of connecting members 490. Each connecting member 490 has a first end connected to a second convex member of a first spoke and a second end connected to a second convex member of a second spoke adjacent to the first spoke. In the illustrated embodiment, the connecting member 370 is a convex arc defined by a single radius. In an alternative embodiment (not shown), the connecting member is defined by multiple radii. In one specific embodiment, the connecting member is a geometric curve. In another alternative embodiment, the connecting member includes at least one linear component. In yet another alternative embodiment (not shown), the connecting members are omitted.

The stem 440 extends from the inner annular band 410, and both the second convex member 480 and the connecting member 490 contact the outer annular band 420. In an alternative embodiment (not shown), only the second convex member contacts the outer annular band. In another alternative embodiment (not shown), only the connecting member contacts the outer annular band.

The first and second branches 450a,b and first convex member 460 are connected to the first and second branches and convex members of the adjacent spokes. Likewise, the third and fourth branches 470a,b and second convex member 480 are connected to the third and fourth branches and second convex members of the adjacent spokes. In the illustrated embodiment, the spokes 330 are not discrete, but instead form a web. In an alternative embodiment, each spoke is discrete.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
    an inner annular band;
    an outer annular band constructed of a polymeric material and having a reinforcement structure embedded therein; and
    a plurality of spokes extending from the inner annular band to the outer annular band, wherein the spokes are configured to carry a load in compression and in tension, and wherein each spoke includes:
        a first concave sidewall,
        a second concave sidewall opposite the first concave sidewall, wherein a bottom portion of the first concave sidewall is connected to a bottom portion of the second concave sidewall, and
        an upper convex arch having a first end connected to the first concave sidewall and a second end connected to the second concave sidewall, such that the first concave sidewall, the second concave sidewall, and the upper convex arch form a closed geometric shape
    wherein each spoke further includes:
        a third concave sidewall having a bottom portion connected to a top portion of the upper convex arch;
        a fourth concave sidewall having a bottom portion connected to the top portion of the upper convex arch and to the bottom portion of the third concave sidewalk; and
        a second upper convex arch having a first end connected to the third concave sidewall and a second end connected to the fourth concave sidewall, such that the third concave sidewall, the fourth concave sidewall, and the second upper convex arch form a second closed geometric shape.

2. The non-pneumatic tire of claim 1, wherein each of the plurality of spokes further includes a stem extending radially downward from the bottom portion of the first concave sidewall and the bottom portion of the second concave sidewall.

3. The non-pneumatic tire of claim 1, wherein each of the plurality of spokes is a discrete spoke.

4. The non-pneumatic tire of claim 1, wherein the plurality of spokes form a web.

5. The non-pneumatic tire of claim 1, wherein the plurality of spokes further include a plurality of connecting members, wherein each connecting member has a first end connected to an upper convex arch of a first spoke and a second end connected to an upper convex arch of a second spoke adjacent to the first spoke.

6. The non-pneumatic tire of claim 1, wherein the plurality of spokes further include a plurality of connecting members, wherein each connecting member has a first end connected to a second upper convex arch of a first spoke and a second end connected to a second upper convex arch of a second spoke adjacent to the first spoke.

7. The non-pneumatic tire of claim 1, wherein the reinforcement structure of the outer annular band is selected from the group consisting of a pair of angle steel belts, a single angled steel belt, and a steel band.

8. The non-pneumatic tire of claim 1, wherein the reinforcement structure of the outer annular band includes a first reinforcement layer and a second reinforcement layer radially above the first reinforcement layer.

9. A tire comprising:
    a first hoop;
    a second hoop outside the first hoop; and
    a plurality of spokes extending from the first hoop to the second hoop, each spoke including:
        a first sidewall having a concave shape when the tire is in an unloaded condition,
        a second sidewall opposite the first sidewall, wherein the second sidewall has a concave shape when the tire is in an unloaded condition, and wherein a bottom portion of the first sidewall is connected to a bottom portion of the second sidewall,
        a stem extending downward from the bottom portion of the first sidewall and the bottom portion of the second sidewall, the stem directly contacting the first hoop, and
        an upper member having a first end connected to the first sidewall and a second end connected to the second sidewall, such that the first sidewall, the second sidewall, and the upper member form a closed geometric shape, wherein the upper member has a convex shape when the tire is in an unloaded condition, and wherein a curved portion of the upper member directly contacts the second hoop.

10. The tire of claim 9, wherein the first sidewall and the second sidewall of each spoke retain concave shapes when the spoke is placed in compression.

11. The tire of claim 9, wherein the first sidewall and the second sidewall of each spoke retain concave shapes when the spoke is placed in tension, and wherein the upper member of each spoke retains a convex shape when the spoke is placed in tension.

12. The tire of claim 9, wherein each spoke is stiffer in tension than in compression.

13. The tire of claim 9, wherein each spoke extends axially across the first hoop and axially across the second hoop.

14. The tire of claim 9, wherein each spoke carries a load when in compression and when in tension.

15. The tire of claim 9, wherein each of the plurality of spokes further includes:
    a third sidewall having a concave shape, the third sidewall having a bottom portion connected to a top portion of the upper member;
    a fourth sidewall having a concave shape, the fourth sidewall having a bottom portion connected to the top portion of the upper member and to the bottom portion of the third sidewall; and
    a second upper member having a first end connected to the third sidewall and a second end connected to the fourth sidewall, such that the third sidewall, the fourth sidewall, and the second upper member form a second closed geometric shape.

16. A non-pneumatic tire comprising:
a first polymeric band;
a second polymeric band; and
a web extending from the first polymeric band to the second polymeric band, wherein the web is configured to carry a load in compression and in tension, and wherein the web includes:
- a plurality of U-shaped spokes, each U-shaped spoke having a concave portion, and a pair of radial stems extending from the concave portion, wherein the pair of radial stems has a radial height greater than a radial height of the concave portion, wherein each stem directly contacts the first polymeric band, and wherein the concave portion does not directly contact the first polymeric band and does not directly contact the second polymeric band, and
- a plurality of members, wherein each member directly contacts a concave portion of at least one of the U-shaped spokes, and wherein each member directly contacts the second polymeric band.

17. The non-pneumatic tire of claim 16, wherein the first polymeric band is an inner annular band and wherein the second polymeric band is an outer annular band.

18. The non-pneumatic tire of claim 16, wherein each of the plurality of U-shaped spokes is formed by a pair of discrete spokes.

19. The non-pneumatic tire of claim 16, wherein each of the plurality of members is a curved member, each curved member having:
- a first end directly connected to a concave portion of a first U-shaped spoke,
- a second end directly connected to a concave portion of a second U-shaped spoke connected to the first U-shaped spoke, and
- a middle portion directly connected to the second polymeric band.

20. The non-pneumatic tire of claim 19, wherein the first U-shaped spoke and the second U-shaped spoke are connected through a common radial stem.

* * * * *